Patented July 31, 1928.

1,678,940

UNITED STATES PATENT OFFICE.

ERIK GUSTAV HEDSTRÖM, OF STOCKHOLM, SWEDEN.

ROOT-FILLING SUBSTANCE.

No Drawing. Application filed November 13, 1926, Serial No. 148,316, and in Sweden September 27, 1926.

The inventor has found that natural asphalt, particularly Syrian asphalt, is admirably suitable as a root-filling substance.

As is well known, natural asphalts are products of transformation of earth-oil. All natural asphalts are absolutely insoluble in water, diluted acids and alkalies, and are difficult to dissolve in alcohol and acetone, whereas in some other solvents, such as benzole, chloroform, carbon disulphide, etc., they are readily dissolved. If natural asphalt is dissolved in a suitable solvent, there will remain upon the evaporation of the solvent a residual layer of asphalt in the form of a glossy black, coherent and impenetratable coating on the surface upon which the solution has been spread out. This makes a solution of natural asphalt very suitable as a root-filling substance.

At the same time the solvent should be an efficient non-exciting antiseptic and, moreover, it should be capable of dissolving fats so as to be able to dissolve any fatty substances remaining in the cavities, such substances being then incorporated in the solidified mass and are thus rendered harmless. A suitable solvent is to be had in benzole.

The asphalt connects very intimately with the walls of the canals, and is not subjected to any alterations within the canals, nor to any decomposition through the action of bacteria. The remedy is absolutely impervious to water and does not leave any spaces between the wall of the canal and the filling after the solvent has evaporated and has been removed. Asphalt is entirely inert against organic tissues, whether these be soft or hard.

The solution, which must not be too viscid, is introduced into the canals by means of a fine probe with pumping movements against the apex, and may then be forced up further by means of a hard rubber needle until the filling has really penetrated up to the apex.

Inasmuch as asphalt does not show off clearly on the Röntgen-plate, it is preferred to make the solution assignable röntgenographically by the addition to the solution of a substance which is impervious, or practically so, to Röntgen-rays; among such substances bismuth salts may be mentioned. Better results, however, have been attained with a precious noble metal in colloid form.

What I claim is:—

1. A root-filling substance comprising a solution of natural asphalt.
2. A root-filling substance comprising a solution of natural asphalt in benzole.
3. A root-filling substance comprising a solution of Syrian asphalt.
4. A root-filling substance comprising a solution of Syrian asphalt in benzole.
5. A root-filling substance comprising a solution of natural asphalt and a substance which is practically impervious to Röntgen rays.
6. A root-filling substance comprising a solution of natural asphalt in benzole and a substance which is practically impervious to Röntgen rays.
7. A root-filling substance comprising a solution of Syrian asphalt and a substance which is practically impervious to Röntgen rays.
8. A root-filling substance comprising a solution of Syrian asphalt in benzole and a substance which is practically impervious to Röntgen rays.

In testimony whereof I affix my signature.

ERIK GUSTAV HEDSTRÖM.